June 12, 1934.  B. A. BENSON  1,962,856
ORANGE JUICE EXTRACTOR
Filed April 10, 1933  2 Sheets-Sheet 1
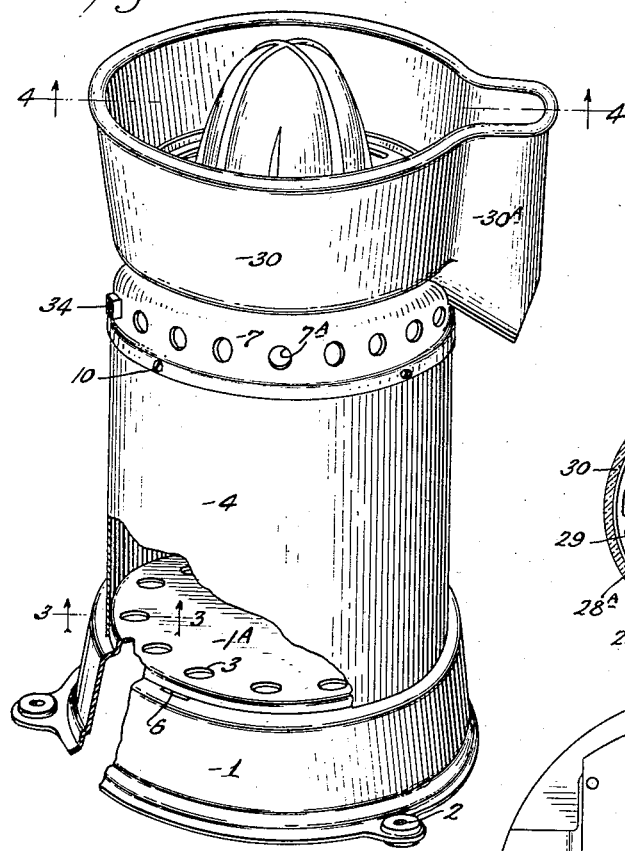
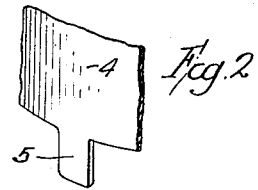
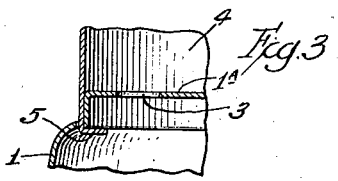
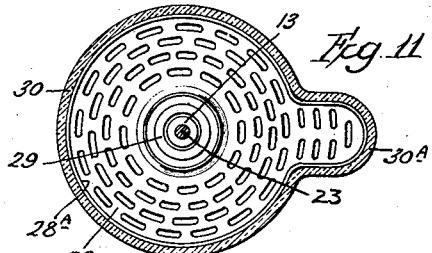
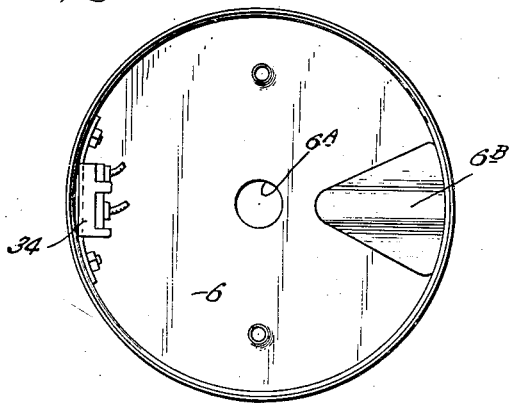
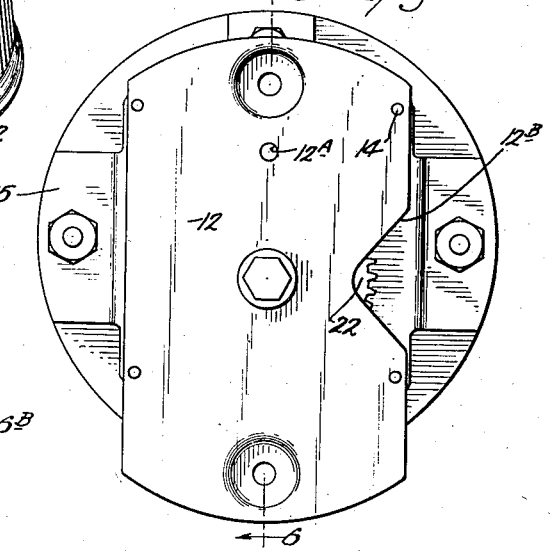
Inventor:
Bernhart A. Benson
by Albert Scheible
Attorney June 12, 1934. B. A. BENSON 1,962,856
ORANGE JUICE EXTRACTOR
Filed April 10, 1933 2 Sheets-Sheet 2
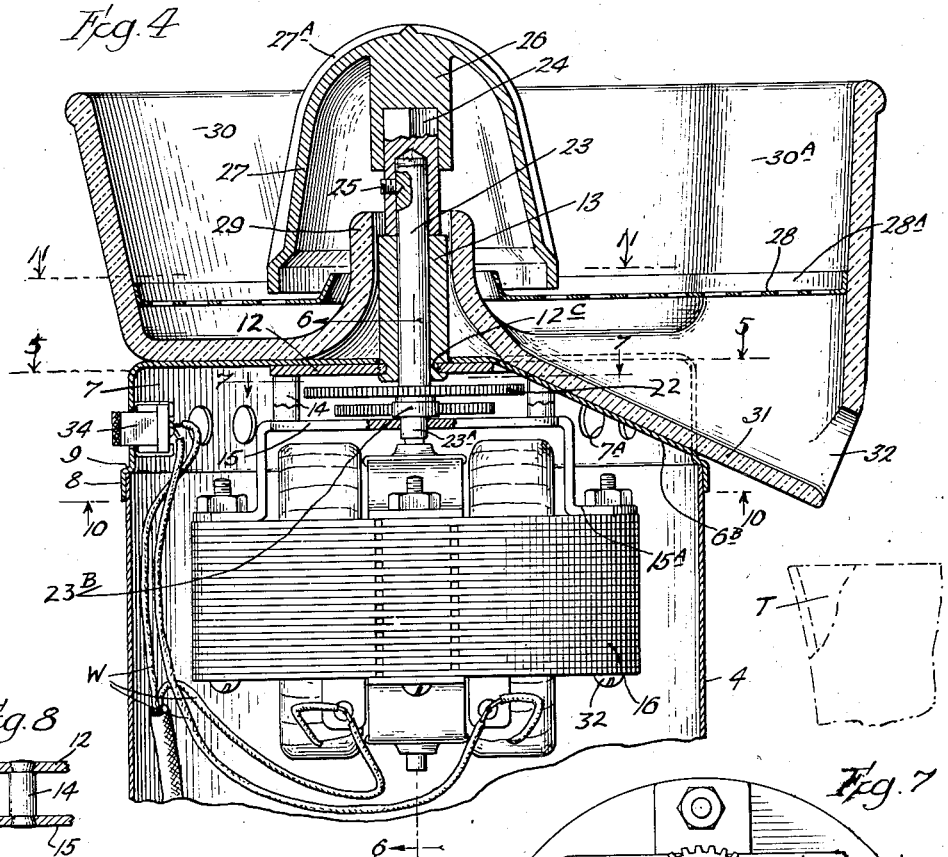
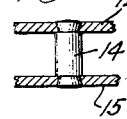
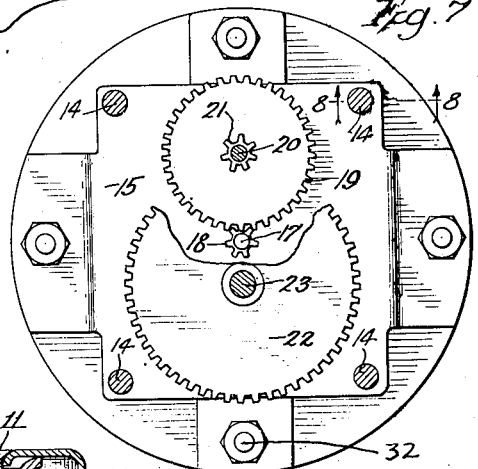
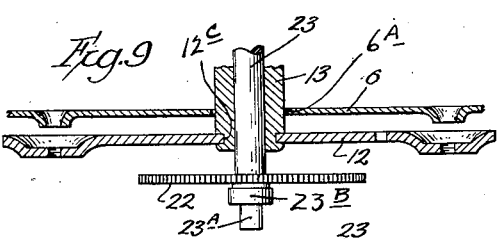
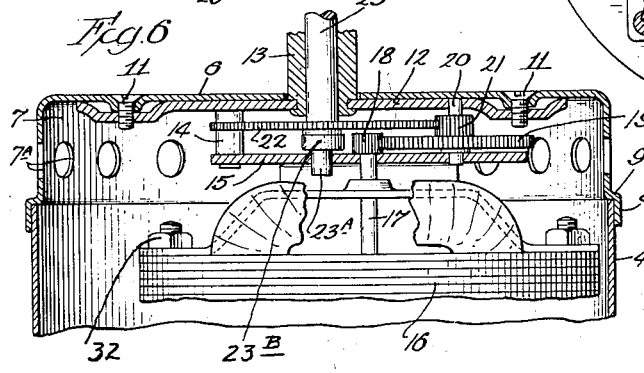
Inventor:
Bernhart A. Benson
by Albert Scheible
Attorney Patented June 12, 1934

1,962,856

UNITED STATES PATENT OFFICE 1,962,856

ORANGE JUICE EXTRACTOR

Bernhart A. Benson, Chicago, Ill., assignor to Chicago Electric Manufacturing Company, Chicago, Ill., a corporation of Illinois Application April 10, 1933, Serial No. 665,259

9 Claims. (Cl. 146—3)

My invention relates to a fruit juice extractor of the class in which the juice and pulp is scraped out of part of an orange or the like by a rotating reamer, and in which this reamer is rotated by an electric motor disposed in a housing below the reamer.

In some of its general objects, my invention aims to provide a construction and arrangement of the parts of such a juice extractor which will cheapen and expedite the manufacture and assembling, which will permit a ready detaching of a pulp strainer, which will permit easy access to the mechanism. Furthermore, my invention aims to provide an extractor construction which will greatly reduce the vibration and strain on the hand of the user during the extracting of juice from fruit, which will permit the strainer to remain stationary during the rotation of the reamer, which will afford ventilation within the housing for cooling the motor, which will firmly resist the thrust upon the reamer during the fruit-reaming operation, and which will permit a convenient oiling or greasing of the thrust bearing without disassembling the appliance.

Illustrative of the above and also of more detailed objects of my invention,

Fig. 1 is a perspective view of an orange juice extractor embodying my invention, with portions of the drum of the housing and of the base broken away.

Fig. 2 is an enlarged exterior perspective view of a portion of the said drum.

Fig. 3 is a similarly enlarged fragmentary vertical section, taken along the line 3—3 of Fig. 1.

Fig. 4 is an enlarged vertical section through somewhat more than the upper half of the same juice extractor, taken along the line 4—4 of Fig. 1.

Fig. 5 is a horizontal section taken along the line 5—5 of Fig. 4.

Fig. 6 is a fragmentary vertical section taken in a plane at right angles to the section of Fig. 1 and along the line 6—6 of Fig. 5.

Fig. 7 is a horizontal section taken along the line 7—7 of Fig. 4.

Fig. 8 is a fragmentary vertical section taken along the line 8—8 of Fig. 7.

Fig. 9 is a section similar to a portion of Fig. 6, showing the position of the shaft and the shaft-supporting plate during the assembly of the extractor.

Fig. 10 is a bottom view of the cap of the drum before parts other than the control switch have been attached to this cap, drawn on the same scale somewhat larger than that of Fig. 1.

Fig. 11 is a horizontal section taken along the line 11—11 of Fig. 4, drawn on a reduced scale and taken while the reamer was detached.

To afford an inexpensive housing for the reamer-rotating mechanism of my appliance, I construct this of three sheet metal parts, the lower of which is an inverted cup-shaped base 1 provided with circumferentially spaced feet 2 which will space the lower edge of the base from a table on which the appliance is seated, and having its top 1 A provided with ventilating perforations 3, which perforations preferably are adjacent to the periphery of this top.

Seated at its lower end on the top 1 A of the base is an upright drum 4 having a plurality of downwardly projecting fingers 5, as shown in Fig. 2. Each of these fingers extends through a slot 6 in the top of the base and has its free end portion bent under a portion of the base top, as shown in Fig. 4, to secure the drum to the base.

Detachably fitted upon the upper end of the drum 4 is a cap which includes a top 6 provided with a central perforation 6 A, a depending tubular flange 7 provided with ventilating apertures 7 A, and a lower tubular flange extension 8. This flange extension fits slidably over the upper end portion of the drum and is offset from the flange 7 by an annular shoulder 9 which seats on the upper end of the drum, and the cap is fastened to the drum by screws 10 (Fig. 1) extending through the said flange extension.

Housed by the said cap and clamped upwardly against the top 6 of the cap by screws 11 is a suspending plate 12 (Figs. 5 and 6) having a perforation 12 C (Fig. 4) alining with but of smaller diameter than the perforation 6 A in the cap. Clinched at its lower end through this perforation 12 C (as shown in Figs. 4 and 9) and extending through the central perforation 6 A in the top of the cap is a tubular and upright journal 13. Rigidly suspended from the corners of the suspending plate 12 by spacer pins 14 is a motor-supporting plate 15 having feet 15 A from which the stator 16 of an electric motor is suspended by bolts 32.

This motor has its upright shaft 17 (Fig. 6) fastened to a pinion 18 meshing with a gear 19, the shaft 20 of which gear is journaled both in a perforation 12 A of the suspending plate 12 and a corresponding bore in the motor-supporting plate 15. The shaft 20 also has a pinion 21 fastened to it and meshing with a gear 22 fastened to an upright reamer shaft 23. This reamer shaft extends upwardly through the upright journal 13; and the part of the shaft above this guide has a shaft cap 24 detachably fastened to it by a screw 25, with this cap seating on the top of the said journal to support the shaft, this cap having a polygonal upper end.

The reamer shaft 23 has its lower end portion 23 A extending freely through a perforation in the motor-supporting plate 15 (as shown in Fig. 6) to reduce the strain on the clinching of the said guide to the suspending plate 12; and the reamer shaft has an integral collar 23 B (Figs. 6 and 9) which supports the gear 22 and which can temporarily seat on the motor-supporting plate 15 during the assembling of the mechanism. However, the reamer shaft 23 is lifted to raise the collar 23 B off the plate 15 before the shaft cap 24 is fastened to the reamer shaft by tightening the screw 25, so that this shaft is supported by the tubular guide 13 independent of the motor-supporting plate.

Slidably fitting the polygonal upper end of the shaft cap 24 is the correspondingly polygonally bored shank 26 of a reamer 27 which has surface ribs 27 A, the bore of this shank being of such limited depth that its upper end seats on the upper end of the shaft cap as shown in Fig. 4 to support the reamer with the lower edge of the reamer freely spaced upwardly from a strainer 28.

Before the reamer is slipped upon the shaft cap 24, a detachable juice bowl is set down upon the top 6 of the cap of the mechanism housing. This bowl has a tubular projection 29 rising from its bottom, with a portion of this projection approximately fitting the shaft guide 13, and the bowl has a portion 30 A of its riser wall 30 to form a semi-cylindrical upright extension projecting radially of the projection 29 beyond the drum 4. The bottom of the bowl includes a portion 31 leading to the said projecting riser wall 30 A and sloping downward toward this wall, so as to form a discharge trough and the said riser wall portion 30 A has a discharge opening 32 in its lower part.

To allow for this downward slope of the trough, the cap top 6 of the mechanism housing has a portion 6 B dished downwardly, as shown in the bottom view of Fig. 10, and the suspending plate 12 has a corresponding edge recess 12 B as shown in Fig. 5. Thus arranged, the trough portion 31 of the bowl bottom fits into the downwardly formed part 6 B of the cap of the housing to keep the bowl from rotating, so that the discharge of juice will always be in a definite direction to reach a tumbler T under it as shown in dotted lines in Fig. 4.

To separate the extracted pulp from the juice, I provide a strainer 28 having a peripheral riser flange 28 A shaped to fit against the inner face of the entire riser wall of the said bowl when the bottom of the strainer is disposed somewhat lower than the bottom of the reamer, this strainer bottom being provided with suitable perforations, such as those indicated at 28 B in Fig. 11.

With my juice extractor thus constructed, I secure the following advantages in comparison with motor-driven extractors now on the market:

(1) By integrally interlocking the drum of the mechanism housing with the base member, I enable a small number of screws 10 to suffice for the detachable fastening means.

(2) By providing air inlets 3 in the base member and air outlets 7 A in the riser portion 7 of the cap I insure a continuous circulation of air (by convection) through the mechanism housing to cool the motor; and by disposing the air inlets near the drum I facilitate this air movement.

(3) By downwardly dishing a part of the cap of the mechanism housing so that the discharge trough of the bowl fits into this part, I eliminate the need of an additional housing section as heretofore used for this purpose.

(4) By suspending the motor from the cap of this housing, I reduce the noise which results when the motor is mounted on the base.

(5) By using a shaft cap seating on the top of the tubular shaft guide 13 as the sole means for supporting the shaft, I relieve the parts inside the mechanism housing from the downward thrust placed on this shaft cap when the user presses a half-orange down on the reamer during the extracting of the juice.

(6) By having the lower end of the reamer shaft 23 extend slidably through the motor-supporting plate and normally spacing the gear 22 on this shaft downwardly from the suspending plate 12, as shown in Figs. 4 and 6, I permit the user to lift this shaft by grasping shaft cap 24 so as to raise that cap off the thrust-receiving upper end of the upright journal 13 when the bowl and reamer have previously been detached. This enables the user to oil or grease the single thrust-receiving bearing of my appliance easily and without detaching the cap of the housing or otherwise disassembling the appliance beyond the extent needed for cleaning the bowl, strainer and reamer.

(7) By fastening the thrust-receiving upright journal 13 to a separately formed plate 12 fastened to the cap, I obtain a rigid supporting for this thust-receiving journal without employing a heavy grade of metal for the cap of the housing, as this plate can be formed of considerably heavier metal than the cap.

(8) By suspending the motor-supporting plate 15 from the suspending plate 12, I provide a compact and convenient space for a train of gears to reduce the speed of rotation of the reamer. Consequently, I can readily use a high speed motor for rotating the reamer at so low a speed that even a delicate woman or a child can retain her grip on a half-orange during the extraction of the juice; thereby overcoming a serious objection to the heretofore marketed juice extractors in which the reamer rotates at the same speed as the armature of the motor, and also permitting a decided saving in the cost of the needed motor.

(9) By clamping the suspending plate 12 upwardly against the cap I also reduce the vibration of my appliance when in operation. This reduction in vibration cooperates with the speed reduction for greatly reducing the strain on a hand holding the fruit during the extracting of the juice.

(10) By using the suspending plate 12 and the motor-supporting plate 15 as the sole means for journaling some shafts of the speed-reducing gears, I provide a simple and inexpensive mounting for the speed-reducing mechanism.

(11) By supporting the entire motor and speed-reduction assembly from the cap, I enable the user to detach this entire mechanism as a unit from the drum of the mechanism housing for free access to the motor when this needs housing; this has not been conveniently possible in the heretofore employed juice extractors in which the motor is supported by the base of the housing. And by the same arrangement, I also reduce the length of the reamer shaft as well as the total weight and cost of the appliance.

(12) By first assembling the motor and the speed-reducing means between the two rigidly connected plates 12 and 15, I greatly facilitate the manufacture, as this assembly then can speedily be fastened to the cap by merely sliding the shaft guide upwardly through the cap (as indicated in Fig. 9) and then attaching the screws 11 of Fig. 6.

(13) By forming the bowl so as to prevent the strainer from rotating, I secure a much more effective separation of the pulp from the juice than is possible with a rotating strainer, since any rotation of a strainer directs both the pulp and the juice against the peripheral portion of the strainer where the accumulated pulp quickly clogs the apertures of the strainer.

(14) By arranging my juice extractor so that almost all of the metal parts can be cheaply formed of relatively light sheet metal, I greatly reduce the weight and cost of my appliance in comparison with the customary types employing much heavier castings and requiring machining operations on these castings.

In practice, I also desirably mount a switch 34 inside the cap, with the handle of the switch projecting through the depending flange 7 of the cap as shown in Figs. 1 and 4, and with the circuit wires W sufficiently long to permit the motor to be lifted out of the drum. However, I do not wish to be limited in this respect. Nor do I wish to be limited to other details of the construction and arrangement heretofore described, since many changes might be made without departing either from the spirit of my invention or from the appended claims.

I claim as my invention:

1. In a fruit juice extractor, a housing comprising an upright drum; a cap detachably fitting the upper end of the drum, an upright journal rising from the cap, an upright reamer shaft extending upwardly through the cap and journaled in the said journal; a suspending plate supported within the cap and supporting the journal, an electric motor disposed within the drum, a speed-reducing means operatively interposed between the motor and the said shaft, and supporting means associated with the said plate for supporting the motor and the speed-reducing means from the said plate.

2. In a juice extractor, an assemblage as per claim 1, and means associated with the said shaft for supporting the shaft from the said journal.

3. In a juice extractor, an assemblage as per claim 1, in which the supporting means include a second plate spaced downwardly from and supported by the suspending plate, in which the speed-reducing means include a train of gears disposed between the suspending plate and the said second plate.

4. In a juice extractor, an assemblage as per claim 1, in which the supporting means include a second plate spaced downwardly from and supported by the suspending plate, in which the speed-reducing means include a train of gears disposed between the suspending plate and the said second plate, and in which the motor is suspended from the second plate.

5. In a juice extractor, an assemblage as per claim 1, in which the supporting means include a second plate spaced downwardly from and supported by the suspending plate, and in which the speed-reducing means include a train of gears disposed between the suspending plate and the said second plate, the speed-reducing means including a gear shaft journaled in both of the said plates.

6. In a juice extractor, an assemblage as per claim 1, in which the suspending plate is clamped flat-wise against the lower face of the top of the cap to stiffen this top and to reduce vibration.

7. In a juice extractor, an assemblage as per claim 1, in which the supporting means include a second plate spaced downwardly from and supported by the suspending plate, and in which the speed-reducing means include a train of gears disposed between the suspending plate and the said second plate, the reamer shaft having its lower end portion extending slidably through the said second plate.

8. In a juice extractor, an assemblage as per claim 1, in which the supporting means include a second plate spaced downwardly from and supported by the suspending plate, and in which the speed-reducing means include a trains of gears disposed between the suspending plate and the said second plate, the supporting means including upright members rigidly spacing the said two plates, whereby the said second plate and the said members serve to stiffen the suspending plate.

9. In a fruit juice extractor of the class in which a reamer is rotated about a vertical axis within a bowl and above the bottom of the bowl, a bowl of generally circular contour having a portion of its riser wall bowed outwardly and having a discharge outlet in the lower part of its said outwardly bowed riser wall portion, the inner face of the remaining portions of the said riser wall flaring upwardly; and a strainer having a flat bottom and having a peripheral riser flange corresponding in contour to the cross-section of the interior of the bowl at a level approximately that of the lower end of the reamer; the said flange flaring upwardly in correspondence with the upward flare of the inner face of the riser wall of the bowl, so that the said flange will wedge in the bore of the bowl to support the strainer with the bottom of the strainer freely spaced upwardly from the bottom of the bowl and with the said strainer flange in flatwise engagement with the riser wall of the bowl, and so that the part of the strainer which projects into the said outwardly bowed portion of the riser wall of the bowl will prevent the strainer from rotating.

BERNHART A. BENSON.